US006757574B2

(12) United States Patent
Gardner et al.

(10) Patent No.: US 6,757,574 B2
(45) Date of Patent: Jun. 29, 2004

(54) METHODS AND APPARATUS FOR PRODUCING ANIMAL SOUNDS TO LURE ANIMALS

(75) Inventors: William James Gardner, Brewer, ME (US); Tommy J. Martin, Lubbock, TX (US)

(73) Assignee: G&B Patent Holdings, LLC, Brewer, ME (US)

( * ) Notice: Subject to any disclaimer, the term of this patent is extended or adjusted under 35 U.S.C. 154(b) by 0 days.

(21) Appl. No.: 09/483,653

(22) Filed: Jan. 14, 2000

(65) Prior Publication Data

US 2003/0093169 A1 May 15, 2003

(51) Int. Cl.[7] .......................... G06F 17/00; A01K 15/02
(52) U.S. Cl. ........................ 700/94; 381/124; 119/719; 119/174; 367/139
(58) Field of Search .......................... 381/61, 124, 56; 116/22 A; 119/719, 174, 51.01; 367/139; 446/297, 397; 43/1

(56) References Cited

U.S. PATENT DOCUMENTS

| | | | |
|---|---|---|---|
| 3,414,873 A | | 12/1968 | Richard et al. |
| 4,105,992 A | * | 8/1978 | Luciano ...................... 367/139 |
| 4,218,676 A | | 8/1980 | Worsham et al. |
| 4,896,305 A | * | 1/1990 | Gimbal ........................ 367/139 |
| 4,934,088 A | | 6/1990 | Pine, Jr. et al. |
| 4,968,283 A | | 11/1990 | Montgomery |
| 5,239,587 A | | 8/1993 | Muckelrath |
| 5,282,178 A | * | 1/1994 | Hill et al. .................... 367/141 |
| 5,555,664 A | | 9/1996 | Shockley |
| 5,572,592 A | | 11/1996 | Muckelrath |
| 5,575,240 A | | 11/1996 | Udelle et al. |
| 5,673,651 A | | 10/1997 | Udelle et al. |
| 5,679,049 A | * | 10/1997 | Arad et al. .................. 446/142 |
| 5,785,005 A | | 7/1998 | Udelle et al. |
| 5,802,197 A | | 9/1998 | Fulcher |
| 5,928,056 A | | 7/1999 | Molotschko |
| 5,964,054 A | | 10/1999 | Galfidi, Jr. |
| 6,058,887 A | | 5/2000 | Silverman |
| 6,226,229 B1 | * | 5/2001 | Dinardo ...................... 367/139 |
| 6,234,865 B1 | | 5/2001 | Battey |
| 6,359,549 B1 | * | 3/2002 | Lau et al. ............... 340/384.71 |
| 6,414,906 B1 | * | 7/2002 | Gaspari ...................... 367/139 |
| 2002/0058457 A1 | | 5/2002 | Butler |
| 2002/0116862 A1 | | 8/2002 | McNeil |

FOREIGN PATENT DOCUMENTS

DE     299 04 653     2/1999

OTHER PUBLICATIONS

"Electronic Game Callers," "Lohman Electronic Call," "Hunter's Buddy Electronic Caller," "FOXPRO® Digital Game–Calling System," and "Burnham SC–95 Cassette Caller," Cabela's Master Catalog, Fall 1999, Edition II., p. 476 copyrighted 1999 by Cabela's Inc., Sidney, Nebraska.
"The World's Best Wildlife Caller",—Wildlife Technologies–Products, http://www.wildlifetech.com/product.html.
"Master Sound List," Wildlife Technologies—Master Sound List, http://www.wildlifetech.com/product.html.

\* cited by examiner

Primary Examiner—Xu Mei
(74) Attorney, Agent, or Firm—Wolf, Greenfield & Sacks, P.C.

(57) ABSTRACT

Method and apparatus for luring a member of an animal species to an area in an environment. In one aspect, a pre-recorded sound that simulates an environmental contact sound made by the animal species in the environment is played back to lure the member of the animal species to the area. In another aspect, first and second pre-recorded sounds that simulate first and second sounds made by the animal species in the environment are played back contemporaneously.

56 Claims, 4 Drawing Sheets

METHODS AND APPARATUS FOR PRODUCING ANIMAL SOUNDS TO LURE ANIMALS

FIELD OF THE INVENTION

This invention relates to methods and apparatus for producing animal sounds to lure animals.

BACKGROUND OF THE INVENTION

A common technique used in luring an animal is to call the animal by mimicking vocal sounds made by the animal. For example, when hunting deer, the call may mimic a social grunt made by deer, so that deer in the area will come to investigate. Typically, a hunter makes an animal call by distorting the sound of his voice (e.g., using his hands) or by using acoustic devices designed to generate animal calls.

Studies have shown that many animals (e.g., deer) have hearing that is sensitive to subtle differences in sound. Therefore, an inexperienced or unskilled caller may be unable to distort his own voice sufficiently well to fool animals into believing that the sound came from another animal. Thus, animals may not come within firing range, i.e., close enough to allow the hunter to fire an accurate shot or to get a good photograph. Further, when a hunter uses his own voice or an acoustic device to make an animal call, an animal fooled enough to come within a certain proximity of the hunter may then either smell or see the hunter, and leave before the animal is within firing range or before the hunter has time to discharge his weapon or to take a photograph.

Also, when a person distorts his/her voice to make animal calls, over time the person's vocal cords may tire, such that the vocal sound can no longer be reproduced accurately. Similarly, when using a mechanical acoustic device to generate animal calls, one or more mechanical parts of the device may wear down such that the vocal sound can no longer be produced accurately.

In response to these problems, some hunters have employed electronic animal calling devices. Such devices may include a library of animal calls that are pre-recorded (e.g., in a studio), stored on a storage medium and played back in the field. Thus, the animal calls can be played back consistently, without a concern about tiring the vocal cords of the hunter or the wearing of mechanical parts. While such electronic calling devices provide a number of advantages, applicants have discovered several drawbacks as discussed below.

SUMMARY OF THE INVENTION

One illustrative embodiment of the present invention is directed to a method of luring a member of an animal species to an area in an environment. The method comprises an act of playing back a pre-recorded sound that simulates an environmental contact sound made by the animal species in the environment.

Another illustrative embodiment of the invention is directed to an apparatus for luring a member of an animal species to an area in an environment. The apparatus comprises: a recording medium storing a pre-recorded sound that simulates an environmental contact sound made by the animal species in the environment; a controller to play back the pre-recorded sound; and a speaker to reproduce the pre-recorded sound when the pre-recorded sound is played back.

A further illustrative embodiment of the invention is directed to an apparatus for luring a member of an animal species to an area in an environment. The apparatus comprises: means for storing a pre-recorded sound that simulates an environmental contact sound made by the animal species in the environment; means for playing back the pre-recorded sound; and means for reproducing the pre-recorded sound when the pre-recorded sound is played back.

Another illustrative embodiment of the invention is directed to a method for luring a member of an animal species to an area in an environment. The method comprises an act of contemporaneously playing back first and second pre-recorded sounds that were recorded separately, and that respectively simulate first and second sounds made by the animal species in the environment.

A further illustrative embodiment of the invention is directed to an apparatus for luring a member of an animal species to an area in an environment. The apparatus comprises: a recording medium storing first and second pre-recorded sounds that simulate first and second sounds made by the animal species in the environment; a controller to play back the first and second pre-recorded sounds contemporaneously; and a speaker to reproduce the first and second pre-recorded sounds when the first and second pre-recorded sounds are play d back.

Another illustrative embodiment of the invention is directed to an apparatus for luring a member of an animal specie to an area in an environment. The apparatus comprises: means for storing first and second pre-recorded sounds that simulate first and second sounds made by the animal species in the environment; means for playing back the first and second pre-recorded sounds contemporaneously; and means for reproducing the first and second pre-recorded sounds when the first and second pre-recorded sounds are played back.

These and other aspects of the present invention will be more readily understood and appreciated from the following de tailed description, which should be read together with the accompanying drawings and figures, in which:

DETAILED DESCRIPTION

While the use of electronic animal calling devices that include a pre-recorded library of animals calls provides a number of advantages, applicants have discovered that such systems are limited in their effectiveness. For example, conventional electronic animal calling devices only produce vocal animal sounds and animal-to-animal contact sounds that are produced by contact between two or more animals (e.g., the rattling together of the antlers of two bucks). Applicants have discovered that animals can be more effectively lured to a particular area by producing calls that also mimic what is referred to herein as environmental contact sounds, which refer to sounds made by an animal contacting an inanimate object indigenous to its environment such as, for example, the ground, trees, bushes, shrubs, brush and grass. In addition, conventional electronic animal calling devices, while providing a library of calls, provide limited flexibility to the hunter. In this respect, each call is a relatively lengthy fixed sequence of vocal sounds or animal-to-animal contact sounds, which must be played in its entirety every time it is played. Thus, although the hunter can choose from one of several different call sequences, the hunter has no capability of customizing different calls using particular animal sounds. The term animal sounds is used herein to refer generally to vocal animal sounds, animal-to-animal contact sounds and environmental contact sounds.

In one embodiment of the present invention, a method and apparatus is provided for luring animals that includes the production of environmental contact sounds. As discussed below, environmental contact sounds can be particularly effective in luring animals to a particular area. The present invention is not limited to any particular environmental contact sounds, as numerous environmental contact sounds are possible. Thus, the description provided below merely provides several examples of the types of environmental contact sounds that can be employed, and is not intended to limit the scope of this aspect of the present invention. Furthermore, numerous implementations of a system for producing environmental contact sounds are possible, with the present invention not being limited to any particular implementation. Thus, the specific implementations described below are provided merely for illustrative purposes, and are not intended to limit the scope of this aspect of the present invention.

In one embodiment of the present invention, a system is provided that can produce vocal animal sounds, animal-to-animal contact sounds and environmental contact sounds, which can be particularly advantageous in luring animals to a particular area. However, it should be understood that the present invention is not limited in this respect, and that other embodiments of the present invention can employ only environmental contact sounds.

In another embodiment of the present invention, a method and apparatus is provided for luring animals by providing a user with the ability to combine two or more calls dynamically to customize a series of calls to lure an animal. Thus, two or more separately recorded calls can be played contemporaneously, to create a realistic sound that is better capable of luring an animal. For example, vocal animal sounds can be played contemporaneously with animal-to-animal contact sounds or environmental contact sounds. It should be appreciated that playing two or more separately recorded calls contemporaneously does not require that each call begin and end at the same instant, as all that is required is that at least portions of the two or more separately recorded calls overlap when played. For example, an end portion of a first recorded call may be played contemporaneously with a beginning portion of a second recorded call. By providing a user with the ability to play two or more calls contemporaneously, this aspect of the present invention provides the user with tremendous flexibility in customizing a call sequence.

In another embodiment of the present invention, a method and apparatus is provided for luring animals by providing a user with the ability to select and produce dynamically two or more animal sounds in sequence. The resulting sequence of calls may include the same sound repeated two or more times, or may be a succession of different sounds. Being able to dynamically combine animal sounds, particularly sounds of relatively short duration, provides a user with flexibility not available from conventional electronic animal calling devices that provide relatively long fixed pre-recorded calling sequences.

Although in the illustrative implementation discussed below each of the above described aspects of the present invention are advantageously employed together, it should be appreciated that the present invention is not limited in this respect, and that each of the above-discussed aspects can be employed separately. For example, the aspect of the present invention related to the simultaneous playing of two or more calls need not be employed in connection with environmental contact sounds, and advantageously can be employed even if limited to the use of vocal calls and/or animal-to-animal contact calls.

It should be appreciated that the present invention can be employed in connection with the calling of any of numerous types of animals, as the present invention is not limited to luring any particular type of animal. In the illustrative example discussed below, particular calls are described that are advantageous for luring deer. However, this explanation is provided merely for illustrative purposes, as the particular calls obviously can be modified to lure other types of animals (e.g., coyotes, turkeys, bears, etc.), as the present invention is not limited to a device for calling any particular type of animal.

Figure 1:
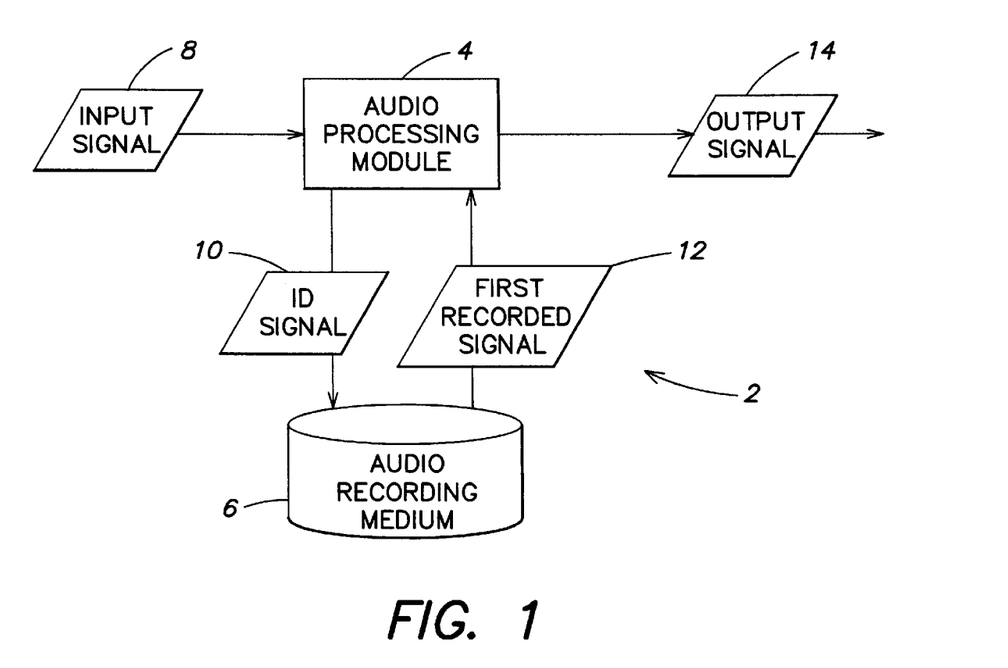
FIG. 1 is a data flow diagram of one illustrative embodiment of the invention directed to a system for producing animal sounds.

The above-described aspects of the present invention can be implemented in any of numerous ways, as the present invention is not limited to any particular manner of implementation. An illustrative data flow diagram illustrating one technique for implementing various aspects of the present invention is shown in FIG. 1. However, it should be appreciated that the present invention is not limited to the use of a system implemented according to this data flow diagram, as this is merely one example of a technique for implementing various aspects of the present invention.

FIG. 1 illustrates a system 2 that includes an audio processing module 4 connected to an audio recording medium 6 having one or more audio signals pre-recorded thereon. The audio processing module 4 receives an input signal 8 (e.g., from a user interface device) signaling the user's desire to produce a certain animal sound. The audio processing module 4 processes the input signal 8 and generates an ID signal 10 that is presented to the audio recording medium 6 to identify a pre-recorded sound on the audio recording medium that corresponds to the sound identified by the input signal 8. In response to its receipt of the ID signal 10, the audio recording medium 6 returns a first recorded signal 12 to the audio processing module. The audio processing module then processes the first recorded signal 12 to produce an output signal 14 that represents the production of the sound requested by the input signal 8.

As should be appreciated from the foregoing, the data flow diagram shown in FIG. 1 illustrates a system wherein a user manipulates a user interface to select a desired sound pre-recorded on the audio recording medium, and that sound is then played back. Each of the components of the system, i.e., the audio processing module 4, the audio recording medium 6 and the user interface (not shown) can be implemented in any of numerous ways, as the present invention is not limited to any particular manner of implementation.

Each signal recorded on the audio recording medium 6 may be a temporal sequence of audio data that, when played back, simulates an animal sound, such as a vocal animal sound, an animal-to-animal contact sound, an environmental contact sound or any combination of these sounds. An animal sound may be pre-recorded to be particularly suitable for luring a specific animal species. The sounds may be generated and recorded in any of numerous ways as the present invention is not limited to any particular sound generation technique. For example, the pre-recorded sounds may be actually generated by animals, or may be generated by skilled animal caller. In either case, when the pre-recorded sound is played back in the field, it simulates the generation of the animal sound in the field.

The animal sounds can be recorded using any type of recording technology (e.g. analog or digital) and can be stored on any type of storage media. When the animal sounds are recorded digitally, the animal sounds may be digitally sampled at any of various sampling rates to produce the recorded signals. As the sampling rate of the recorded signal increases, the amount of data needed to digitally record the sound, and thus the storage space needed for the recorded signal, increases proportionally. Further, it is well known that the sampling rate limits the frequencies of sound that may be accurately recorded and played back, as components of the sound having a frequency more than half of the sampling rate can not be accurately recorded. For example, if a sound is recorded at a sampling rate of 10 kHz, only components of the sound having up to a frequency of 5 kHz can be accurately recorded and played back. Thus, a digitally recorded animal sound should be recorded at a sampling rate high enough to capture a frequency range of animal sounds within the hearing range of the animal to be lured. Therefore, when choosing a sampling rate at which to digitally record animal sounds, the amount of needed storage space can be considered along with the hearing range of the targeted animal.

For example, studies have shown deer have a hearing range between approximately 0.5 kHz and 16 kHz. In one embodiment of the invention, in which twelve deer sounds are stored within a 256 K ROM that also stores a customized program, the deer sounds are recorded digitally at a sampling rate of 10 kHz, thus capturing sounds with frequencies of 5 kHz and less. A 10 kHz sampling rate has been found to provide a desirable balance between providing sufficient frequencies of the recorded sounds that a deer can hear, while consuming less storage space than would be required if a higher sampling rate were used to store the full frequency range that is audible to deer.

In one exemplary embodiment of the invention, a system is provided to lure deer, and includes a set of vocal sounds that includes a dominant grunt, a social grunt, an estrus bleat, a fawn distress call, a tending grunt, and a snort wheeze, each of which is discussed below. Because deer are curious and territorial animals by nature, they may be attracted to any sound they believe was made by another deer. Thus, the likelihood that a deer will approach increases as the realism of the sound increases. Some deer sounds may be more likely to attract certain types of deer, for example, does, bucks, or fawns. In addition, some sounds may be more likely to attract deer at certain times of the year, for example, during the rut (i.e., the deer mating season).

A dominant grunt is a vocal sound that a male buck makes during the deer mating season. The purpose of the dominant grunt is to declare the dominance of the grunting buck within a particular territory to other bucks. The dominant grunt may lure other bucks who wish to confront what they will perceive as another buck making the dominant grunt.

A social grunt is a grunt made as a social gesture by a buck or doe to other deer in a relaxed environment. A social grunt may attract other bucks and does, in particular, who wish to socialize, and may cause a deer to be less wary because of the comfort they derive from believing other deer are in the area.

An estrus bleat is a vocal sound that a doe makes to inform bucks that she is in heat. Such a call may be effective particularly in attracting bucks during the deer mating season.

A tending grunt is a vocal sound that a buck makes during the rut when chasing a doe that is in heat. The tending grunt informs the doe of a buck's intention to mate. The tending grunt attracts, in particular, does in heat and bucks who wish to confront the grunting buck.

The snort wheeze is the sound that a buck makes when confronted by another buck. The snort wheeze is typically a pre-cursor to a buck battle, in which the bucks will lock horns and fight over territory or for the right to mate with a doe.

A fawn distress call is a vocal sound that a fawn makes when confronted with danger or when injured. Such a call may be effective particularly in attracting does.

Animal-to-animal deer contact sounds also may be used to lure animals. Animal-to-animal deer contact sounds may include, but are not limited to, a buck battle and social sparring, each of which is discussed below.

A buck battle is an aggressive sound of two deers antlers crashing together during battle. Such a sound may attract other curious deer.

Social sparring is also the sound of two deer antlers coming into contact, but less aggressively than during a buck battle. Social sparring is the sound of antlers gently touching together, a common gesture used by deer to establish social order.

As discussed above, environmental contact sounds also may be used to lure animals, and, in some cases, may be more effective. For example, deer tend to relax more when they hear a sound made by another deer moving or coming in contact with an object common to the deer's natural habitat, such as a tree, brush, or the ground. When a deer is relaxed, the deer is more likely to approach the source of a sound. Thus, an environmental contact sound may be more likely to bring the deer closer to the source of the sound, and hopefully well within firing range. In one embodiment of the invention, a system is provided for luring deer that includes, but is not limited to, environmental contact sounds such as an antler tree rub, a ground scrape, a forage paw, and a deer step, each of which is discussed below.

The antler tree rub is the sound of bucks rubbing their antlers up and down on small trees. This rubbing is used to mark territory and annually to remove velvet from the buck's antlers as the antlers mature.

The ground scrape is a sound a deer makes when it kicks back dirt and leaves with its hooves. A buck uses the ground scrape to leave its scent in the ground. The buck's scent informs does and other bucks that the buck is the dominant buck in an area. The buck's scent attracts other does and bucks who wish to investigate. An investigating doe who is in heat may defecate or urinate in the same spot as the ground scrape to inform the buck who made the ground scrape that she is in heat. Thus, the ground scrape particularly may be effective during the mating season to attract does. Further, another buck may investigate the scent and decide to challenge the buck's dominance in the area.

The forage paw is the sound made by a deer when the deer is pushing back leaves and brush to get at acorns, apples, or other foods. In contrast to the ground scrape, which is a relatively long deliberated brushing back of leaves and brush, the forage paw is a less aggressive sound.

The deer step is the sound of a single deer hoof stepping through forest brush. As discussed further below, in one embodiment of the invention, the single deer step can be repeated in sequence at increasing or decreasing volume to simulate a deer walking toward or away from the hunted animal. Further, the frequency of the repetition may be increased or decreased to simulate different speeds of a deer moving through brush.

In one embodiment of the present invention, a system for attracting deer is provided that includes each of the vocal sounds, animal-to-animal contact sounds and environmental contact sounds described above, which are believed to provide a particularly effective array of sounds for attracting deer. However, it should be appreciated that the present invention is not limited in this respect, and that a different collection of sounds could be employed to attract deer. Furthermore, as discussed above, the present invention is not limited to use in a system for attracting deer, such that a completely different set of sounds can be employed in other embodiments for attracting other types of animals.

Figure 2:
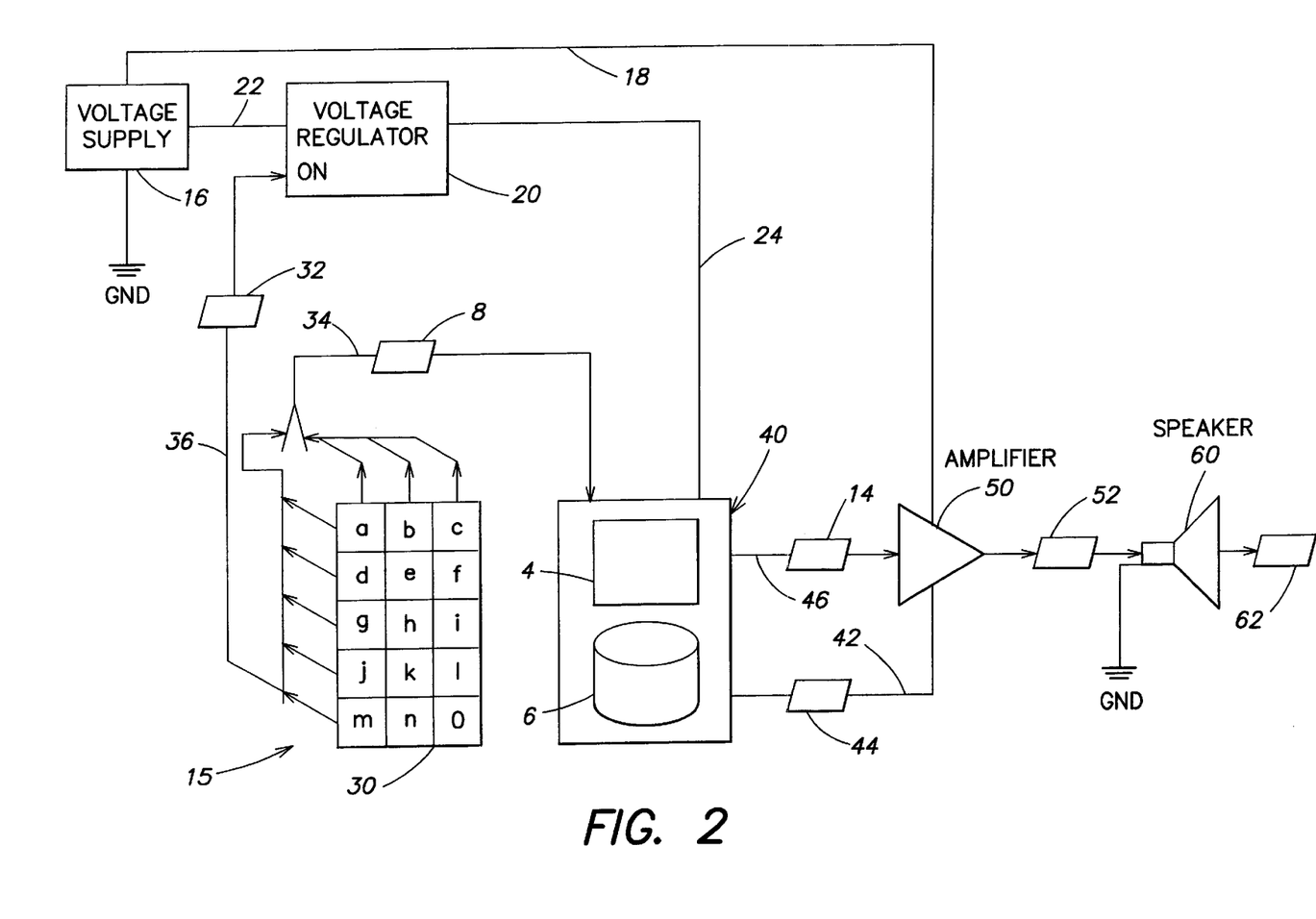
FIG. 2 is a block diagram showing one illustrative implementation of the system of FIG. 1.

FIG. 2 is a block diagram of one illustrative embodiment of the present invention which implements a system 15 that operates as described above in connection with FIG. 1. This particular implementation is described herein solely for illustrative purposes, as the present invention can alternatively be implemented in numerous other ways.

The system 15 includes an audio processing unit 40 that includes the audio processing module 4 and audio recording medium 6 as discussed above in connection with FIG. 1. In one embodiment of the invention, the audio processing unit 40 is an SPC251A sound controller commercially available from SunPlus Technology Co., LTD of Taiwan. The SPC251A is a user-programmable sound processor, which includes an 8-bit RISC processor and a 256 K-bit ROM to store programming information that controls the functional characteristics of the audio processing unit 40. Thus, a user can provide a customized library of sounds that can be stored in the ROM (so that the ROM serves as the audio recording medium 6 of FIG. 1), as well as a customized set of instructions for the RISC processor to control operation of the audio processing unit 40. The SPC251A also includes twenty-four input/output (I/O) lines to receive input signals from a user interface such as a keypad 30 discussed further below, and produces an analog audio output signal 14.

In addition to the audio processing unit 40, the system 15 also includes a user interface in the form of the keypad 30, as well as a speaker 60 to produce a selected animal sound 62. Thus, in a manner similar to that described above in connection with the data flow diagram of FIG. 1, a user can manipulate the keypad 30 to select a particular animal sound stored within the audio recording medium 6 of the audio processing unit 40, and the selected sound will be played over the speaker 60.

It should be appreciated that the present invention is not limited to using any particular type of user interface for interfacing with the audio processing unit 40, nor to using any particular speaker and associated hardware for generating the selected animal sound 62. In one embodiment of the present invention, the speaker 60 is selected to be an all-weather 10-watt, 5-inch speaker, and the system 15 includes a 0.5-watt amplifier 50 to produce an amplified output signal 52 on signal carrier 46 (wire or bus) that drives the speaker 60. The use of an all-weather speaker is advantageous, as it enables a user to use the system in all types of weather. In addition, it has been found that a 10-watt, 5-inch speaker provides a desirable balance between the ability to generate animal sounds at a desired volume, while minimizing power consumption. In this respect, as discussed in more detail below, in one embodiment of the present invention it is desirable to have the system 15 be as efficient as possible to minimize the size of any power supply needed to drive the system 15, which can help reduce the overall weight of the system, thereby making it easier to transport into the field. Although a speaker 60 having the characteristics described above has been found to be advantageous, it should be appreciated that the present invention is not limited to use with such a speaker, and that numerous other types of speakers can be employed, including speakers of different size and power and speakers that are not weather-proof.

As discussed above, in the illustrative embodiment of FIG. 2, a keypad 30 serves as the user interface to enable a user to select sounds to be played by the audio processing unit 40. The keypad 30 includes 15 inputs (labeled a-o) that correspond to various instructions to be issued to the audio processing unit 40. The keypad 30 can be implemented in any of various ways. For example, each input a-o can correspond to a pushbutton that, when pressed, activates a switch that asserts a corresponding signal (such as the input signal 8 described in connection with FIG. 1) that is transmitted over a signal carrier 34 (e.g., a wire or data bus) to the audio processing unit 40. One of the inputs a-o can be dedicated to each of the separate animal sounds that is stored on the audio recording medium 6. In addition, other inputs can be provided to control various functions of the audio processing unit 40, such as a volume up control, a volume down control, and a power on/off toggle button. Of course, it should be appreciated that these additional functions are merely illustrative, as different or additional functions alternatively can be provided on the keypad 30. Furthermore, as discussed above, the present invention is not limited to employing a keypad as the user interface, as various other types of user interfaces alternatively can be employed.

In one embodiment of the present invention, the data bus 34 includes sufficient bits (e.g., eight bits) to enable the input signal 8 transmitted to the audio processing unit 40 to uniquely identify which of the inputs a-o was selected to cause the generation of the input signal 8.

As discussed above, in accordance with one embodiment of the present invention, the capability is provided to enable two or more animal sounds to be played contemporaneously. In the embodiment shown in FIG. 2, this capability is provided by the audio processing unit 40, as the SPC251A sound controller internally has two parallel channels that contemporaneously can process two input signals 8 received from the touch pad 30, and can produce the two corresponding sounds in parallel. Thus, when the system 15 is implemented using the SPC251A sound controller as shown in FIG. 2, the system is limited to playing two sounds contemporaneously. However, it should be appreciated that the present invention is not limited in this respect, and that other implementations are possible that enable the contemporaneous playing of three or more sounds.

The playing of two sounds contemporaneously is handled by the SPC251A sound controller in the following manner. Input signals 8 received over the bus 34 typically are directed to a first channel within the audio processing unit 40. If that channel is busy processing a previously-received input signal when a new input signal is received, the new input signal is routed to the second channel. Each channel then operates independently to retrieve the selected sound from the audio recording medium 6, and to process the sound in the audio processing module 4 to generate an output signal 14 on signal carrier 46 to the amplifier 50. If the user attempts to select an additional input when both channels are busy, the input key simply will be ignored by the audio processing unit 40.

In one embodiment of the invention (not shown), the output signals from the two channels can be carried on separate signal carriers (e.g., wires) to separate speakers. Alternatively, in the embodiment shown in FIG. 2, the outputs of the two channels are combined to generate a single combined output signal 14 for transmission to the amplifier 50, thereby eliminating the need for multiple speakers. As a result, the speaker 60 will generate an animal sound 62 that incorporates both of the animal sounds selected by the user and processed separately through the two channels in the audio processing unit 40. The combining of the two or more output signals can be done in any of numerous ways, as the present invention is not limited to employing any particular combining techniques. In one embodiment, the output from each channel of the SPC251A is carried on a respective signal carrier (e.g., a wire), and the signal carriers physically are tied together to produce a signal output signal 14 on signal carrier 46.

Other techniques for combining signals alternatively may be used. For example, a summing amplifier may receive the outputs of the two channels and combine the outputs to produce the output signal 14. Further, an audio mixer can be used to combine the outputs of the two channels to produce the output signal 14. Such an audio mixer may include a summing amplifier and other circuitry to mix the output of the two channels.

As discussed above, the present invention is not limited to using the SPC251A sound controller to implement the audio processing unit 40, as the processing unit 40 can be implemented in numerous other ways. All that is required is that the system employ some type of audio processing unit that includes a storage medium 6 (which can be any type of storage medium capable of storing sound or data representing sound) and one or more controllers to serve the functions of the audio processing module 4 which are responsive to the user interface 34 retrieving pre-recorded sounds from the storage medium 6, and forwarding signals representative of the stored sounds to a speaker to play back the sounds. The at least one controller that implements the audio processing module 4 can be implemented in any of numerous ways, such as with a processor programmed to perform the desired functions, with dedicated digital circuitry along with an appropriate digital-to-analog converter for the signals transmitted to the speaker, or with dedicated analog circuitry.

Thus, it should be appreciated that several of the characteristics of the SPC251A sound controller are not limitations on the present invention. For example, within the SPC251A sound controller, sounds are stored in the audio recording medium 6 in a digital format, are converted to an analog signal prior to leaving the audio processing unit 40 for transmission to the amplifier 50, and any combining of two sounds is done after conversion to the analog format. However, this can obviously be done in numerous other ways. For example, the audio processing unit 40 can be provided with an audio recording medium that stores sound in an analog format, such that no digital to analog conversion is required. Furthermore, any combining of two or more sounds can be performed on digital data, rather than analog information. In short, the present invention is not limited to any particular technique for storing information relating to animal sounds, nor to the processing of those sounds to generate the signals that drive the speaker 60 to produce the animal sound 62. Furthermore, while the embodiment shown in FIG. 2 includes a separate amplifier 50 to drive the speaker 60, it should be appreciated that the present invention is not limited in this respect, and that the audio processing unit 40 could itself be provided with an amplifier for driving the speaker 60.

In the illustrative embodiment shown in FIG. 2, the audio processing unit 40 includes amplifier control circuitry (not shown) to turn the amplifier 50 on and off by generating an amplifier on/off signal 44 that is transmitted to an input of the amplifier 50 via a wire or bus 42. The amplifier control circuitry may be capable of producing an on signal or off signal on signal carrier 42 in response to the input signal 8 received from keypad 30. Further, the amplifier control circuitry may be capable of producing an off signal 44 when a period of time has elapsed since any input signal 8 has been received. For example, the amplifier control circuitry may detect when an input signal 8 has been received (e.g., from the keypad 30) and may include a timer or counter to count to a certain threshold time (e.g., fifteen seconds) during which an input signal 8 has not been detected. When the threshold time is reached, the amplifier control circuitry may cause the amplifier control circuitry to assert an off signal 44 to power down amplifier 50. The ability to turn off the amplifier 50 prevents the amplifier from consuming power when not in use. This power-saving feature is particularly advantageous where the amplifier 50 may consume more power than the audio processing unit 40. While advantageous, the present invention is not limited to employing the power-saving feature nor to having the audio processing unit 40 control the turning on and off of the amplifier 50.

After the amplifier control circuitry has turned off the amplifier 50 by asserting a power off signal 44, the amplifier control circuitry may be capable of asserting a power on signal 44 when it next detects an input signal 8.

As discussed above, the keypad 30 may include volume up and down control keys to control the volume of the system. This can be done in any of several ways as the present invention is not limited to any particular implementation technique. In one embodiment, the volume control provided by the SPC251A sound controller can be employed to control the amplifier of the signal 14 output from the audio processing unit 40, which thereby controls the volume of the animal sound 62 played by the speaker 60.

Alternatively, in another embodiment of the invention, a different type of volume control is employed, wherein the signal 14 output from the SPC251A sound controller maintains a constant amplitude, and signal carrier 46 is connected to ground by a plurality of resistors connected in parallel (not shown). In this embodiment, the audio control unit can include circuitry that produces a resistor on/off signal for each of the plurality of resistors in response to volume up or down commands received from keypad 30. For example, if three resistors are connected in parallel between the signal carrier 46 and ground, then the audio processing unit can include three resistor on/off signals, one for each resistor. The audio processing unit 40 may be capable of asserting any combination of the three resistor on/off signals in response to a volume control signal received as input signal 8 from the keypad 30. By selectively activating any combination of three resistors, the audio control unit can change the amplitude of the audio output signal 14 such that the volume of the selected animal sound 62 played by the speaker 60 is changed.

Finally, the illustrative embodiment shown in FIG. 2 also includes a two-component power system to provide power to the audio processing unit 40 and the amplifier 50. In this respect, the power system includes a voltage supply 16 and a voltage regulator 20. The voltage supply 16 can be any supply that provides suitable power. In one embodiment of the invention, the voltage supply 16 is a 9-volt battery, which is desirable in that it is small and light and has been found to provide sufficient power. The voltage supply 16 is connected directly to the amplifier 50 via a wire 18, and is connected to the voltage regulator 20 by a wire 22. The voltage regulator 20 regulates the voltage provided by the voltage supply 16 to generate a 5-volt supply to the SPC251A sound controller via a wire 24. As shown in FIG. 2, the voltage regulator 20 is also coupled to the keypad 30 via a wire or bus 36 to receive an on/off signal 32. In this manner, when the system is turned off, the voltage regulator 20 can be turned off so that it does not draw power from the voltage supply 16.

The system 15 of FIG. 2 can be packaged in any of numerous ways, as the present invention is not limited to any particular packaging arrangement. However, in accordance with one illustrative embodiment of the invention, the system 15 is packaged so that the speaker 60 is separated from the keypad 30, so that those components of the system can be separated by a significant distance in the field. This is advantageous because, as mentioned above, as animals are lured toward the sounds produced by the speaker 60, animals that get close may smell or detect the hunter if he is positioned adjacent the speaker. Thus, by separating the keypad 30 from the speaker 60, the hunter can be positioned a significant distance from the speaker 60 in the field, thereby decreasing the likelihood of the hunter being detected as the animal approaches the speaker 60.

Figure 3:
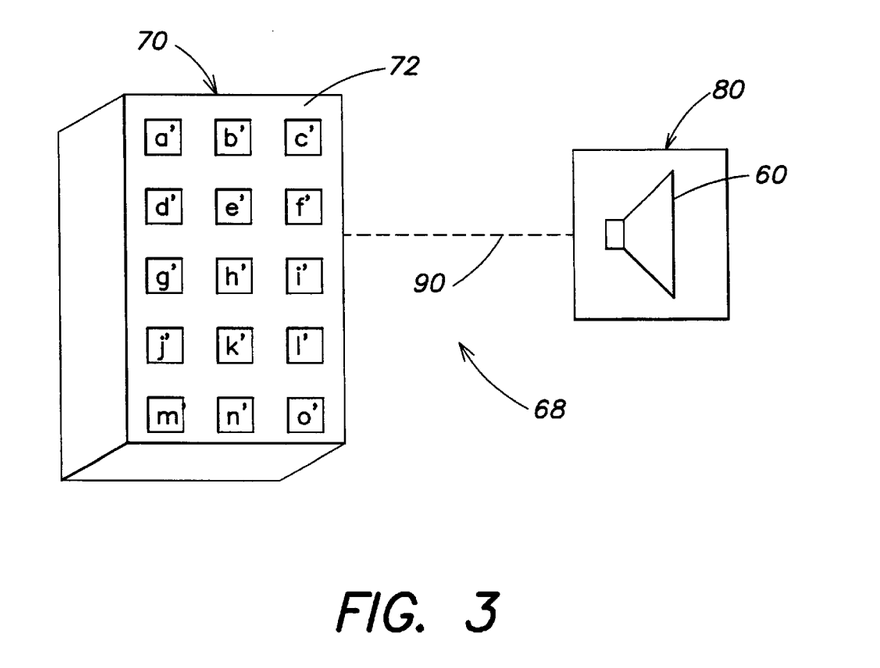
FIG. 3 is a conceptual illustrate on of one embodiment of a remote control unit and a speaker unit for implementing the system of FIGS. 1–2.

Further, separating the keypad 30 from the speaker 60 provides additional safety for a user. For example, hunters may mistake the animal sounds produced by the speaker 60 for an actual animal and fire at an area proximate to the speaker 60. Thus, separating the keypad 30 from the speaker 60 allows a user to stay a safe distance from the targeted area. Also, separating the keypad 30 from the speaker 60 allows a user to remain a safe distance from an aggressive animal lured to the proximity of the speaker by the selected animal sound 62, thus protecting a user from a possible animal attack. Although advantageous, the present invention is not limited to the keypad 30 and the speaker 60 being separated, as the keypad 30 and the speaker 60 alternatively could be an integral part of a solitary unit FIG. 3 is a schematic illustration of one embodiment of a packaging 68 for the system 15. In the embodiment shown in FIG. 3, the system 15 is packaged in two discrete housings 70 and 80. The speaker 60 is provided alone within the housing 80 (such that the speaker housing can serve as the housing 80), with the remaining components of the system 15, including the touch pad 30, being associated with a second housing 70. In this respect, the touch pad 30 can be provided on a face 72 of the housing 70, with the remaining components of the system 15 being disposed therein. The components within the housing 70 communicate with the speaker 60 via a communication medium 90. In one embodiment of the present invention, the communication medium 90 is a run of speaker wire having a sufficient length (e.g., sixty feet) to enable the hunter to be undetected by an animal lured toward the speaker 60 in the field. Of course, the present invention is not limited in this respect as other lengths of speaker wire can be employed. In addition, wireless communication techniques alternatively can be employed to communicate between the housings 70 and 80.

In the embodiment discussed above, each of the components of the system 15 other than the speaker 60 is included in the housing 70, with the speaker 60 being the sole component provided in the housing 80. The present invention is not limited in this respect, as the division of the components between the housings 70 and 80 can be done differently. For example, all of the system components other than the touch pad 30 could be provided in the housing 80 along with the speaker 60, and the housing 70 could serve simply as a remote control unit to control operation of the remainder of the system in the housing 80.

In one embodiment of the invention, the housing 70 that includes the touch pad 30 is preferably a relatively small hand-held unit, that provides the user with tremendous convenience and flexibility in its use. Although advantageous, it should be appreciated that the present invention is not limited in this respect, and that the housing 70 could alternatively take other configurations.

Figure 4:
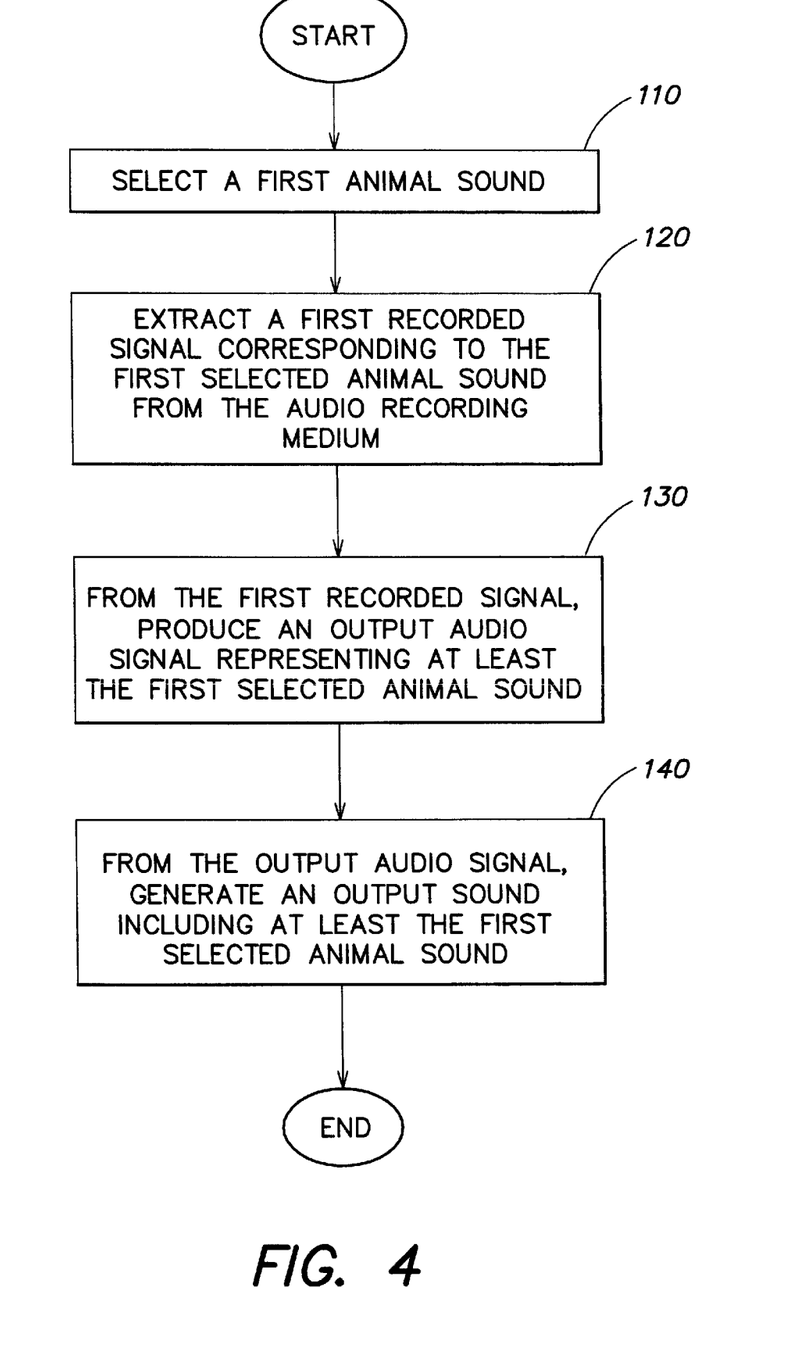
FIG. 4 is a flow chart of one illustrative method for producing simulated animal sounds using the system of FIGS. 1–3.

FIG. 4 is a flow chart of one illustrative method for producing simulated animal sounds 62 using the system of FIGS. 1–3. In step 110, a first animal sound is selected. first animal sound may be selected by depressing the appropriate key on the keypad 30 (FIG. 2). Next, in step 120, a first recorded signal 12 (FIG. 1) corresponding to the first selected animal sound is extracted from the audio recording medium 6. As discussed above, this extraction may be performed by the audio processing module 4 (FIG. 1).

Next, in step 130, an output audio signal 14 (FIGS. 1 and 2) representing the first selected animal sound is produced from the first recorded signal 12. The output audio signal 14 may be produced by the audio processing module 4.

Next, in step 140, an output sound 62 (FIG. 2) is generated from the output audio signal 14, where the output sound 62 includes the first selected animal sound. The output sound may be produced by the speaker 60 that receives the output signal 14.

Steps 110–140 may be repeated several times to produce a sequence of selected animal sounds 62. For example, steps 110–140 may be repeated several times to playback the sound of an animal step to produce a sequence of animal steps, and the volume can be modified between iterations to create the impression that the animal is walking toward or away from the animal being lured. Further, depending on how frequently a user selects sounds, certain steps in the process may occur in parallel as well as in series. For example, if a user selects two sounds in rapid succession, step 130 may be occurring for the first selection while step 110 is occurring on the second selection.

Figure 5:
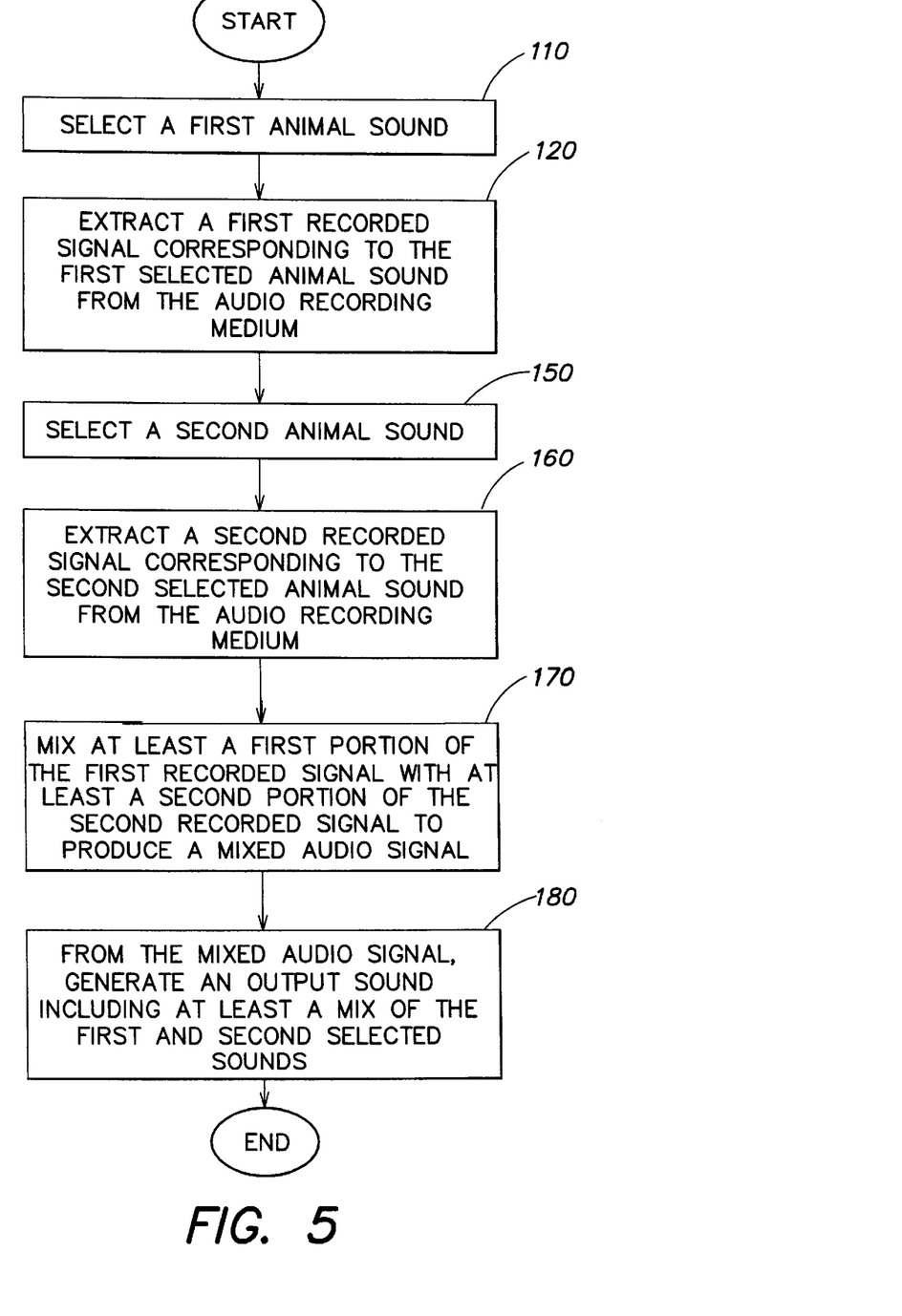
FIG. 5 is a flow chart of one illustrative method for producing combined simulated animal sounds using the system of FIGS. 1–3.

FIG. 5 is a flow chart showing one illustrative method for producing combined simulated animal sounds using the system of FIGS. 1–3. Steps of FIG. 5 that are the same as those of FIG. 4 are labeled with the same number.

First, in step 110, a first animal sound is selected. Next, in step 120, a first recorded signal corresponding to the first selected animal sound is extracted from the audio recording medium. Then in step 150, a second animal sound is selected. The second sound also may be selected using the keypad 30. In step 160, a second recorded signal corresponding to the second selected animal sound is extracted from the audio recording medium 6.

Next, in step 170, a portion of the first recorded signal is combined with a portion of the second recorded signal to produce a combined audio signal. As discussed above, the first and second signal portions may be combined by the audio processing module 4.

Next, in step 180, an output sound is generated from the combined audio signal, where the output sound includes a combination of one or more portions of the first and second selected sounds. The output sound may be produced by the speaker 60 that receives the output signal 14.

As discussed above, the audio processing module 4 and audio recording medium 6 may be implemented in software, hardware or firmware, or any combination of the three. For example, the various elements of the audio processing module 4 and audio recording medium 6, either individually or in combination, may be implemented as a computer program product tangibly embodied in a computer-readable storage medium for execution by a computer processor. Thus, the methods of FIGS. 4 and 5 may be performed by a computer processor executing a program tangibly embodied on a computer-readable medium to perform the described processes.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalence thereto.

What is claimed is:

1. A method of luring an animal to an area in an environment, the method comprising acts of:
   (A) operating a device that includes a recording medium having first and second separately pre-recorded sounds stored thereon, wherein the first pre-recorded sound simulates a first sound made by a species of animal in the environment and the second pre-recorded sound simulates a second sound, distinct from the first sound, made by a species of animal in the environment; and
   (B) contemporaneously playing back the first and second pre-recorded sounds,
   wherein the contemporaneous playing back of the first and second prerecorded sounds produces a combination of sounds for luring the animal.

2. The method of claim 1, wherein the act (A) includes acts of:
   playing back the first and second pre-recorded sounds from a speaker positioned in the area; and
   controlling the playing back of the first and second pre-recorded sounds from a controller that is housed separately and disposed remotely from the speaker.

3. The method of claim 2, wherein the act (A) includes an act of controlling the playing back of the first and second pre-recorded sounds from a hand-held controller.

4. The method of claim 1, wherein the first pre-recorded sound simulates the sound of a step taken by a member of a species of animal, and wherein the method further includes an act of repeating the act (A) to simulate a sound of a member of a species of animal walking.

5. The method of claim 4, further including an act of varying a volume at which the first pre-recorded sound is played back between repetitions to simulate a sound of a member of a species of animal walking in a particular direction.

6. The method of claim 1, wherein the act (A) includes acts of:
   providing an audio-recording medium having a plurality of audio messages recorded thereon, each audio message representing an animal sound, a first of the plurality of audio messages including the first pre-recorded sound and a second of the plurality of audio messages including the second pre-recorded sound;
   receiving input from a user that identifies the first and second pre-recorded sounds for play-back; and
   producing, from the first and second pre-recorded sounds, an output sound that simulates the first and second sounds.

7. The method of claim 6, further comprising acts of:
   receiving a volume control signal; and
   changing a volume of the output sound in accordance with the volume control signal.

8. The method of claim 6, further comprising an act of combining at least a portion of the first pre-recorded sound with at least a portion of the second pre-recorded sound to produce a combined output sound.

9. The method of claim 6, wherein act (A) comprises playing back the first pre-recorded sound, which simulates a vocal animal sound.

10. The apparatus of claim 9, wherein act (A) comprises playing back the second pre-recorded sound, which simulates a second vocal animal sound different than the first vocal animal sound.

11. The method of claim 1, wherein the act (A) includes an act of playing back at least one of the first and second pre-recorded sounds from a recording of a sound actually made by a member of a species of animal.

12. The method of claim 1, wherein the act (A) includes an act of playing back at least one of the first and second pre-recorded sounds from a recording of a manmade sound.

13. The method of claim 1, wherein act (A) comprises playing back the first pre-recorded sound that simulates an animal sound made by a species of animal of which the lured animal is a member.

14. The method of claim 13, wherein act (A) comprises playing back the second pre-recorded sound that simulates an animal sound made by the species of animal of which the lured animal is a member.

15. The method of claim 1, wherein act (A) comprises playing back the first pre-recorded sound that simulates an animal sound made by a first species of animal and playing back the second pre-recorded sound that simulates an animal sound made by the first species.

16. An apparatus for luring an animal to an area in an environment, the apparatus comprising:
   a recording medium storing first and second pre-recorded sounds that simulate first and second distinct sounds each made by a species of animal in the environment; and
   a controller to play back the first and second pre-recorded sounds contemporaneously to produce a combination of sounds for luring the animal.

17. The apparatus of claim 16, further including a speaker to reproduce the first and second pre-recorded sounds when the first and second pre-recorded sounds are played back and a user interface that enables a user to control the playing back of the first and second pre-recorded sounds, wherein the user interface is housed separately and can be disposed remotely from the speaker.

18. The apparatus of claim 17, wherein the user interface is a hand held unit.

19. The apparatus of claim 18, wherein the user interface is a touch pad including a plurality of buttons, wherein a first of the plurality of buttons corresponds to a playing back of the first pre-recorded sound and a second of the plurality of buttons corresponds to a playing back of the second pre-recorded sound.

20. The apparatus of claim 16, further including means for combining at least a portion of the first pre-recorded sound with at least a portion of the second pre-recorded sound to produce a combined output sound when the first and second pre-recorded sounds are played back contemporaneously.

21. The apparatus of claim 16, further including a speaker to reproduce the first and second pre-recorded sounds when the first and second pre-recorded sounds are played back and a volume control that controls a volume at which the speaker reproduces the first and second pre-recorded sounds when the first and second pre-recorded sounds are played back.

22. The apparatus of claim 16, wherein the first pre-recorded sound simulates an environmental contact sound made by a species of animal in the environment and the second pre-recorded sound simulates one of a vocal sound made by a species of animal and an animal-to-animal contact sound made by members of a species of animal in the environment.

23. The apparatus of claim 16, wherein the first pre-recorded sound simulates the sound of a step taken by a member of a species of animal, and wherein the controller can repeatedly play back the pre-recorded sound to simulate a sound of a member of a species of animal walking.

24. The apparatus of claim 16, wherein the controller includes means for playing back the first and second pre-recorded sounds contemporaneously.

25. The apparatus of claim 16, wherein at least one of the first and second pre-recorded sounds is recorded from a sound actually made by a member of a species of animal.

26. The apparatus of claim 16, wherein at least one of the first and second pre-recorded sounds is recorded from a man-made sound.

27. The apparatus of claim 16, wherein at least one of the first and second simulated sounds is made by a species of animal of which the lured animal is a member.

28. The apparatus of claim 16, wherein the first simulated animal sound and the second simulated animal sound are made by a same animal species.

29. The apparatus of claim 16, further comprising:
a speaker to reproduce the first and second pre-recorded sounds when the first and second pre-recorded sounds are played back.

30. The apparatus of claim 16, further comprising:
a first signal representing the first pre-recorded sound on the recording medium, the first pre-recorded sound simulating a first vocal animal sound; and
a second signal representing the second pre-recorded sound on the recording medium.

31. The apparatus of claim 30, wherein the second pre-recorded sound simulates a second vocal animal sound different than the first vocal animal sound.

32. The apparatus of claim 16, wherein the apparatus further comprises:
a battery to provide power to the apparatus.

33. An apparatus for luring an animal to an area in an environment, the apparatus comprising:
means for storing first and second pre-recorded sounds that simulate first and second distinct sounds each made by a species of animal in the environment; and
means for playing back the first and second pre-recorded sounds contemporaneously to produce a combination of sounds for luring the animal.

34. The apparatus of claim 33, wherein at least one of the first and second simulated sounds is made by a species of which the lured animal is a member.

35. The method of claim 33, wherein the first simulated animal sound and the second simulated animal sound are made by a same species of animal.

36. The apparatus of claim 33, further comprising:
means for reproducing the first and second pre-recorded sounds when the first and second pre-recorded sounds are played back.

37. The apparatus of claim 37, further comprising:
a first signal representing the first pre-recorded sound on the recording medium, the first pre-recorded sound simulating a first vocal animal sound; and
a second signal representing the second pre-recorded sound on the recording medium.

38. The apparatus of claim 37, wherein the second pre-recorded sound simulates a second vocal animal sound different than the first vocal animal sound.

39. An apparatus for luring an animal to an area in an environment, the apparatus comprising:
a recording medium on which is stored a first signal representing a first pre-recorded sound that simulates at least a first animal sound made by a species of animal in the environment and a second signal representing a second pre-recorded sound that simulates at least a second animal sound, distinct from the first animal sound, made by a species of animal in the environment;
a user interface including a first button to select the first signal and a second button to select the second signal;
a controller to play back contemporaneously the first and second pre-recorded sounds, in response to the first button and second button being pressed, to produce a combination of sounds for luring the animal; and
a hand held unit to house the recording medium, the user interface and the controller during operation of the apparatus.

40. The apparatus of claim 39, wherein the first animal sound is made by a species of animal of which the lured animal is a member.

41. The apparatus of claim 39, wherein the first animal sound and the second animal sound are made by a same animal species.

42. The apparatus of claim 39, wherein the first pre-recorded sound simulates a first vocal animal sound.

43. The apparatus of claim 42, wherein the second pre-recorded sound simulates a second vocal animal sound different than the first vocal animal sound.

44. The apparatus of claim 39, further comprising:
a speaker, housed separately from the hand-held unit, to reproduce the first and second pre-recorded sounds contemporaneously in response to the playback of the first and second pre-corded sounds by the controller.

45. The apparatus of claim 39, wherein the user interface includes one or more controls to control a volume of the reproduced first and second pre-recorded sounds.

46. The apparatus of claim 39, wherein the apparatus further comprises:
a battery to provide power to the apparatus.

47. A method of luring an animal to an area in an environment using a hand-held unit that houses a recording medium and a user interface, the recording medium storing a first signal representing a first pre-recorded sound that simulates at least a first animal sound made by a species of animal in the environment and storing a second signal representing a second pre-recorded sound that simulates at least a second animal sound made by a species of animal in the environment that is different than the first animal sound, and the user interface including a first button to select the first pre-recorded sound and a second button to select the second pre-recorded sound, the method comprising acts of:
(A) controlling a simulation of the first animal sound by pressing the first button to reproduce the first pre-recorded sound; and (B) controlling a simulation of the second animal sound that is contemporaneous to the simulation of the first animal by pressing the second button to reproduce the second animal sound, wherein the contemporaneous playing back of the first and second pre-recorded sounds produces a combination of sounds for luring the animal.

48. The method of claim 47, wherein act (A) comprises controlling the simulation of the first animal sound made by a species of animal of which the lured animal is a member.

49. The method of claim 48, wherein act (B) comprises controlling the simulation of the second animal sound made by the species of animal of which the lured animal is a member.

50. The method of claim 47, wherein act (A) comprises controlling the simulation of the first animal sound made by a first species of animal, and act (B) comprises controlling the simulation of the second animal sound made by the first species.

51. The method of claim 47, wherein act (A) comprises controlling the simulation of a first vocal animal sound.

52. The method of claim 51, wherein act (B) comprises controlling the simulation of a second vocal animal sound different than the first vocal animal sound.

53. The method of claim 47, wherein act (A) further comprises controlling the reproduction of the first pre-recorded sound by a speaker housed separately from the hand-held unit, and act (B) further comprises controlling the reproduction of the second pre-recorded sound by the speaker.

54. The method of claim 47, wherein the user interface includes one or more volume controls, and the method further comprises an act of:

(C) controlling a volume of the reproduced first and second pre-recorded sounds using the one or more volume controls.

55. The method of claim 47, wherein the hand-held unit further houses a battery, and the method further comprises an act of:

(C) providing power to the user interface and the recording medium using the battery.

56. An apparatus for luring an animal to an area in an environment, the method comprising:

a recording medium on which is stored a first signal representing a first pre-recorded sound that simulates at least a first animal sound made by a species of animal in the environment and a second signal representing a second pre-recorded sound that simulates at least a second animal sound, distinct from the first animal sound, made by a species of animal in the environment;

a user interface including a first button to select the first pre-recorded sound and a second button to select the second pre-recorded sound;

means for contemporaneously playing back the first and second pre-recorded sounds in response to the first button and the second button being pressed to produce a combination of sounds for luring the animal; and a hand-held unit to house the recording medium, the user interface and the means for playing back during operation of the apparatus.

* * * * *

UNITED STATES PATENT AND TRADEMARK OFFICE
CERTIFICATE OF CORRECTION

PATENT NO.   : 6,757,574 B2
DATED        : June 29, 2004
INVENTOR(S)  : Gardner et al.

It is certified that error appears in the above-identified patent and that said Letters Patent is hereby corrected as shown below:

Column 13,
Lines 39, 46 and 52, replace "(A)" with -- (B) --.

Column 13, line 59 through Column 14, line 5,
Replace claim 6 with the following:
   The method of claim 1 wherein the recording medium has a plurality of audio messages recorded thereon, each audio message representing an animal sound, a first of the plurality of audio messages including the first pre-recorded sound and a second of the plurality of audio messages including the second pre-recorded sound, and the method further comprises acts of:
   receiving input from a user that indentifies the first and second pre-recorded sounds for play-back; and
   producing, from the first and second pre-recorded sounds, an output sound that simulates the first and second sounds.

Column 14,
Lines 10-13, replace claim 8 with the following:
   The method of claim 6, wherein act (B) comprise an act of combining at least a portion of the first pre-recorded sound with at least a portion of the second pre-recorded sound to produce the combined output sound.
Line 14, replace "31" with -- 26 -- and "(A)" and -- (B) --.
Line 17, replace "apparatus" with -- method -- and "(A)" with -- (B) --.
Lines 21, 25, 28, 32, and 36, "(A)" with -- (B) --.
Line 57, add -- part of -- between "is" and "a".

UNITED STATES PATENT AND TRADEMARK OFFICE
CERTIFICATE OF CORRECTION

PATENT NO. : 6,757,574 B2
DATED : June 29, 2004
INVENTOR(S) : Gardner et al.

It is certified that error appears in the above-identified patent and that said Letters Patent is hereby corrected as shown below:

<u>Column 16,</u>
Line 5, replace "37" with -- 33 --.

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,757,574 B2
APPLICATION NO. : 09/483653
DATED : June 29, 2004
INVENTOR(S) : William James Gardner et al.

It is certified that error appears in the above-identified patent and that said Letters Patent is hereby corrected as shown below:

In the Claims:

Claim 47, (Col. 17, line 3), after "animal" insert -- sound --;

Claim 56, (Col. 18, line 11), replace "method" with -- apparatus --.

Signed and Sealed this

Twenty-eighth Day of November, 2006

JON W. DUDAS
*Director of the United States Patent and Trademark Office*

(12) INTER PARTES REEXAMINATION CERTIFICATE (0115th)
United States Patent
Gardner et al.

(10) Number: US 6,757,574 C1
(45) Certificate Issued: Nov. 24, 2009

(54) METHODS AND APPARATUS FOR PRODUCING ANIMAL SOUNDS TO LURE ANIMALS

(75) Inventors: William James Gardner, Brewer, ME (US); Tommy J. Martin, Lubbock, TX (US)

(73) Assignee: Extreme Dimension Wildlife Calls, LLC, Hampden, ME (US)

Reexamination Request:
No. 95/000,140, Mar. 30, 2006

Reexamination Certificate for:
Patent No.: 6,757,574
Issued: Jun. 29, 2004
Appl. No.: 09/483,653
Filed: Jan. 14, 2000

Certificate of Correction issued Aug. 31, 2004.

Certificate of Correction issued Nov. 28, 2006.

(51) Int. Cl.
*A01M 31/00* (2006.01)

(52) U.S. Cl. .................. 700/94; 119/174; 119/719; 367/139; 381/124

(58) Field of Classification Search .............. 700/94; 367/139, 141; 381/56, 122, 124, 386; 376/139
See application file for complete search history.

(56) References Cited

U.S. PATENT DOCUMENTS

| | | | |
|---|---|---|---|
| 3,414,873 A | 12/1968 | Richard et al. | |
| 4,896,305 A | 1/1990 | Gimbal | |
| 5,282,178 A | 1/1994 | Hill et al. | |
| 5,572,592 A | 11/1996 | Muckelrath | |
| 5,575,240 A | 11/1996 | Udelle et al. | |
| 5,802,197 A | 9/1998 | Fulcher | |
| 5,964,054 A | 10/1999 | Galfidi, Jr. | |
| 6,396,480 B1 * | 5/2002 | Schindler et al. | 345/169 |
| 6,396,523 B1 * | 5/2002 | Segal et al. | 715/863 |

OTHER PUBLICATIONS

Italian Mimetico TC brochure, May 1999.
Coccia con Big Hunter catalog, vol. 2(2): Jul. 1999.

* cited by examiner

*Primary Examiner*—Majid A. Banankhah (57) ABSTRACT

Method and apparatus for luring a member of an animal species to an area in an environment in one aspect, a pre-recorded sound that simulates an environmental contact sound made by the animal species in the environment is played back to lure the member of the animal species to the area. In another aspect, first and second pre-recorded sounds that simulate first and second sounds made by the animal species in the environment are played back contemporaneously.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–56 are cancelled.

* * * * *